(12) United States Patent
Lee et al.

(10) Patent No.: US 12,025,692 B2
(45) Date of Patent: Jul. 2, 2024

(54) SENSING DEVICE

(71) Applicant: Samsung Electro-Mechanics Co., Ltd, Suwon-si (KR)

(72) Inventors: Young Ki Lee, Suwon-si (KR); Joon Seok Chae, Suwon-si (KR); Seog Moon Choi, Suwon-si (KR); Tae Gyu Ryu, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 512 days.

(21) Appl. No.: 17/232,300

(22) Filed: Apr. 16, 2021

(65) Prior Publication Data

US 2022/0066022 A1 Mar. 3, 2022

(30) Foreign Application Priority Data

Sep. 3, 2020 (KR) .................. 10-2020-0112426

(51) Int. Cl.
| | |
|---|---|
| *H04N 23/67* | (2023.01) |
| *B60R 11/04* | (2006.01) |
| *G01S 13/86* | (2006.01) |
| *G01S 13/931* | (2020.01) |
| *G02B 7/09* | (2021.01) |
| *G02B 13/00* | (2006.01) |
| *G02B 27/64* | (2006.01) |
| *G03B 5/00* | (2021.01) |
| *G03B 13/36* | (2021.01) |
| *H04N 23/55* | (2023.01) |
| *H04N 23/68* | (2023.01) |

(52) U.S. Cl.
CPC ............ *G01S 13/867* (2013.01); *B60R 11/04* (2013.01); *G01S 13/931* (2013.01); *G02B 7/09* (2013.01); *G02B 13/0065* (2013.01); *G02B 27/646* (2013.01); *G03B 5/00* (2013.01); *G03B 13/36* (2013.01); *H04N 23/55* (2023.01); *H04N 23/67* (2023.01); *H04N 23/687* (2023.01); *G03B 2205/0015* (2013.01)

(58) Field of Classification Search
CPC .. G01S 13/867; G01S 13/931; G01S 13/0065; H04N 23/67; H04N 23/687; H04N 23/55; B60R 11/04; G02B 7/09; G02B 27/646
USPC ......................................................... 348/148
See application file for complete search history.

(56) References Cited

FOREIGN PATENT DOCUMENTS

| | | |
|---|---|---|
| CN | 108994820 A | 12/2018 |
| CN | 208207196 U | 12/2018 |
| CN | 110907940 A | 3/2020 |
| CN | 210225575 U | 3/2020 |
| JP | 5160114 B2 | 3/2013 |
| JP | 2014-51284 A | 3/2014 |

(Continued)

OTHER PUBLICATIONS

Chinese Office Action issued on Apr. 1, 2024, in counterpart Chinese Patent Application No. 202110809534.9 (3 pages in English, 6 pages in Chinese).

*Primary Examiner* — Nguyen T Truong

(74) *Attorney, Agent, or Firm* — NSIP Law

(57) ABSTRACT

A sensing device includes a fixed member, a rotation member disposed at both ends of the fixed member, a camera installed on the fixed member, and respective radar units installed on the rotation members, where the respective radar units are configured to sense respective objects at edges of a viewing angle of the camera and respective objects outside of the viewing angle of the camera.

18 Claims, 10 Drawing Sheets

(56) References Cited

FOREIGN PATENT DOCUMENTS

| KR | 10-2016-0061110 A | 5/2016 |
|---|---|---|
| WO | WO 2016/064915 A1 | 4/2016 |

SENSING DEVICE

CROSS-REFERENCE TO RELATED APPLICATION(S)

This application claims the benefit under 35 USC § 119(a) to Korean Patent Application No. 10-2020-0112426 filed on Sep. 3, 2020 in the Korean Intellectual Property Office, the entire disclosure of which is incorporated herein by reference for all purposes.

BACKGROUND

1. Field

The present disclosure relates to a sensing device.

2. Description of Related Art

In the field of advanced driver assistant system(s) (ADAS) for driver assistance, for example, devices such as a camera, a radar, a lidar, and an ultrasonic sensor are respectively used for driver assistance, to assist a driver when the driver drives based on each surrounding (environmental) information sent from each sensor. In such a field, as well as in other fields where such separate sensors are used, each of the sensors take up respective spaces, in addition to a controller which may receive and forward each surrounding information.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a sensing device includes a fixed member, a rotation member disposed at both ends of the fixed member, a camera installed on the fixed member, and respective radar units installed on the rotation members, where the respective radar units are configured to sense respective objects at edges of a viewing angle of the camera and respective objects outside of the viewing angle of the camera.

The sensing device may further include a rotation member driving unit connected between each of the rotation members and the fixed member, to respectively rotate each of the rotation members with respect to the fixed member.

The sensing device may further include a controller in communication with the camera and the respective radar units, and may be configured to respectively control the rotation member driving units.

A first signal of the controller may control a first rotation member driving unit, to selectively change a first inclination angle between a first rotation member of the respective rotation members and the fixed member, independently of a second signal of the controller that may control a second rotation member driving unit to selectively change a second inclination angle between a second rotation member of the respective rotation members and the fixed member.

The first inclination angle may be different than the second inclination angle.

The camera may include a lens barrel, a focus adjustment unit configured to control movement of the lens barrel in a first direction, which is an optical axis direction, a shake correction unit configured to control movement of the lens barrel in a second direction, perpendicular to the optical axis direction, and a housing accommodating the lens barrel, the focus adjustment unit, and the shake correction unit.

The focus adjustment unit may include a carrier accommodating the lens barrel, a focus adjustment magnet installed in any one of the carrier and the housing, and a focus adjustment coil disposed opposite to the focus adjustment magnet.

The shake correction unit may include a guide member to guide the controlled movement of the lens barrel in the second direction, and a shake correction driving unit configured to generate a driving force to move the guide member in the second direction.

The guide member may include a frame installed in the carrier, and a lens holder in which the lens barrel is installed.

The shake correction driving unit may include a first shake correction driving unit configured to generate a driving force in a first axis direction, perpendicular to the optical axis, and a second shake correction driving unit configured to generate a driving force in a second axis direction, perpendicular to both the optical axis direction and the first axis direction.

The first shake correction driving unit may include a first shake correction magnet installed in any one of the frame and the housing, and a first shake correction coil disposed opposite to the first shake correction magnet.

The second shake correction driving unit may include a second shake correction magnet installed in any one of the frame and the housing, and a second shake correction coil disposed opposite to the second shake correction magnet.

The shake correction unit may further include a plurality of ball members configured to guide the frame and the lens holder.

The camera module may include a reflection module configured to change a path of light incident on the reflection module, and a lens module configured to receive the changed path light from the reflection module, where the lens module may include a carrier having an internal space, a lens unit having a plurality of lens groups, and installed on the carrier so that at least one of the lens groups is movable in a longitudinal direction of the carrier, a guide unit including a plurality of guide members disposed on opposing side surfaces of the plurality of lens groups, respectively, to guide movement of at least two lens groups of the plurality of lens groups, and at least two driving wires respectively connected to each of the guide members, made of a shape memory alloy.

The guide unit may include a first guide member disposed on one side of a lens group of the plurality of lens groups, a second guide member disposed to overlap the first guide member, a third guide member disposed on an opposite side surface of the lens group of the plurality of lens groups, and a fourth guide member disposed to overlap the third guide member.

The first guide member may be provided with a plurality of first guide holes disposed to be inclined in one direction, the second guide member may be provided with a plurality of second guide holes disposed to cross the first guide holes, the third guide member may be provided with a plurality of third guide holes disposed to be inclined in a direction, and the fourth guide member may be provided with a plurality of fourth guide holes disposed to cross the third guide holes.

The driving wire may include first and second driving wires connected to cross each other with the first guide member, third and fourth driving wires connected to cross each other with the second guide member, fifth and sixth driving wires connected to cross each other with the third guide member, and seventh and eighth driving wires connected to cross each other with the fourth guide member.

The lens unit may include a first lens group fixedly installed at one end of the carrier, a second lens group disposed at a rear end of the first lens group and configured in the carrier to be movable along an incident direction of light, and a third lens group disposed at a rear end of the second lens group and configured in the carrier to be movable, and the second and third lens groups may be provided with a coupling protrusion coupled to a guide member of the guide unit.

Other features and aspects will be apparent from the following detailed description, the drawings, and the claims.

Figure 1:
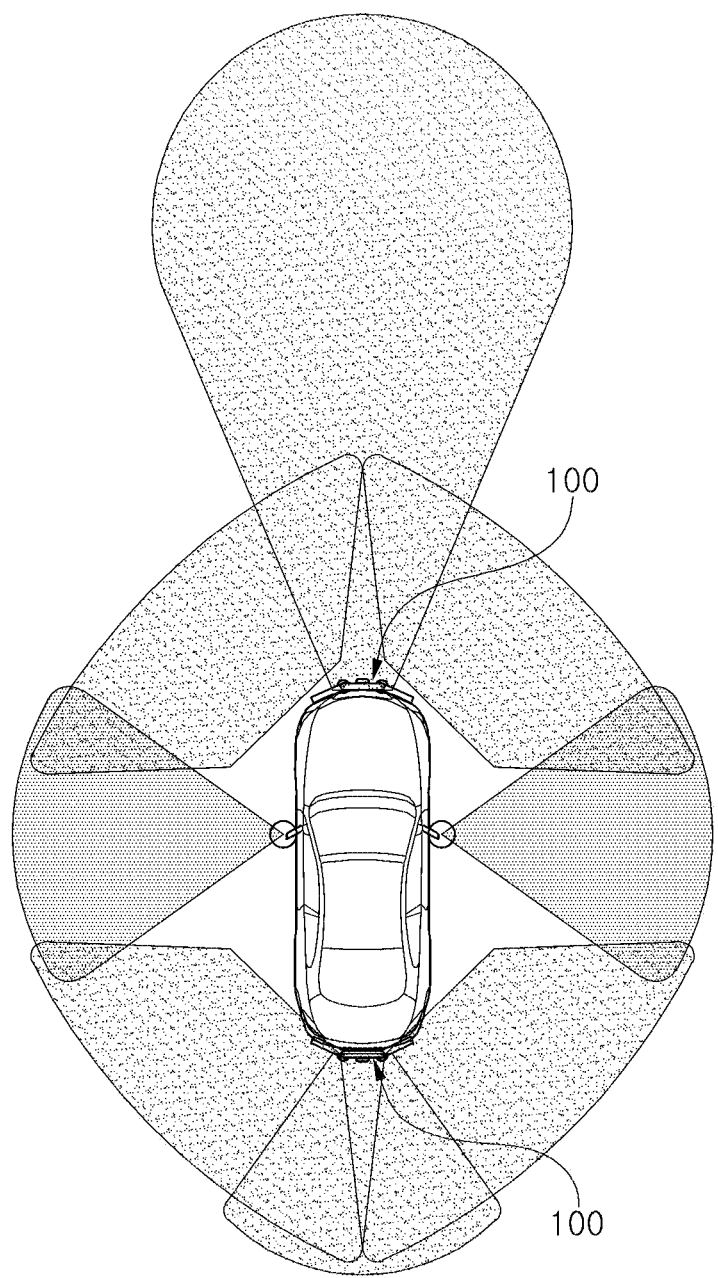
FIG. 1 is a diagram illustrating an example installation state of a sensing device according to one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein. In addition, the use of the term "may" herein with respect to an example or embodiment (e.g., as to what an example or embodiment may include or implement) means that at least one example or embodiment exists where such a feature is included or implemented, while all examples are not limited thereto.

Figure 2:
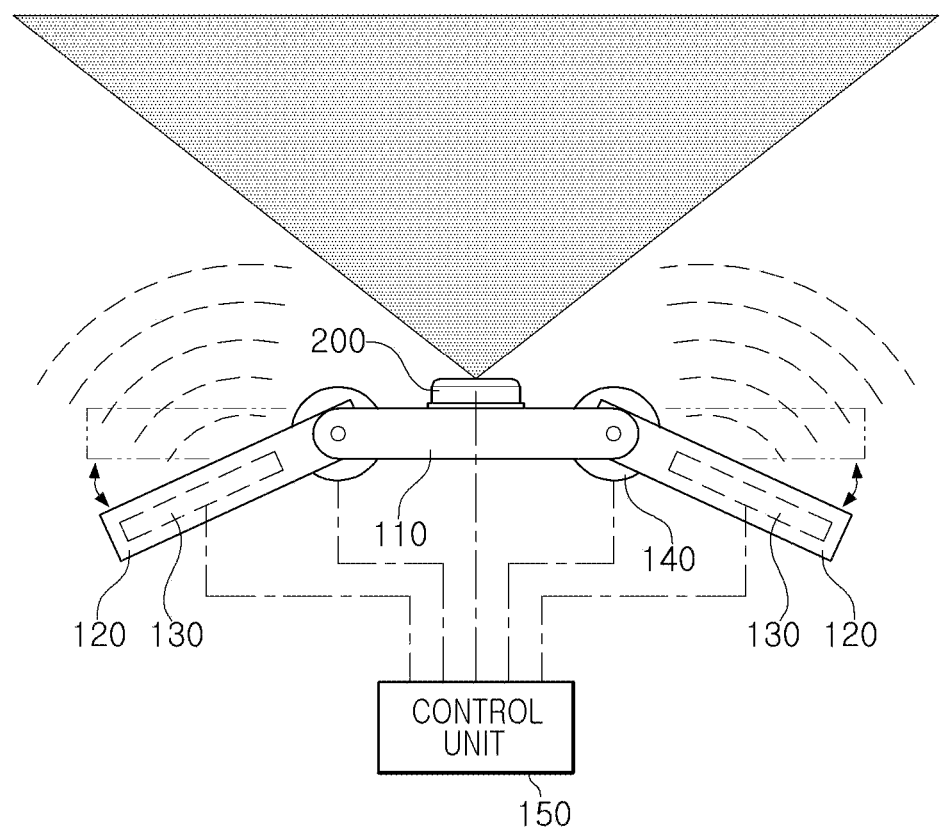
FIG. 2 is a diagram illustrating a sensing device according to one or more embodiments.

FIG. 1 is a diagram illustrating an example installation state of a sensing device according to one or more embodiments, and FIG. 2 is a diagram illustrating a sensing device according to one or more embodiments.

Referring to FIGS. 1 and 2, as an example, one or more sensing devices 100 may be individually installed, such as at a front and at a rear of the vehicle as shown in FIG. 1. For example, the sensing devices 100 may be installed on front and rear surfaces of the vehicle, respectively. The present disclosure is not limited thereto, and the sensing device 100 may also be disposed on a front side and a rear side of an internal space of a boarding unit carried by the vehicle, as well as other surfaces of the vehicle.

Meanwhile, as an example, each sensing device 100 may include a fixed member 110, rotating members 120, a camera 200, radars 130, driving units 140, and a controller (or control unit) 150.

The fixed member 110 has a plate shape, and may be fixedly installed on the vehicle 10. Meanwhile, the camera 200 is fixedly installed on a front of the fixed member 110. As an example, the fixed member 110 may be disposed to be perpendicular to a driving direction of the vehicle.

A rotating (or rotation) member 120 is rotatably installed at both ends of the fixed member 110. As an example, each of the rotating members 120 also have plate shapes, like the fixed member 110. Meanwhile, each rotating member 120 may be disposed to be respectively inclined with respect to the fixed member 110 so that each radar 130, to be described in greater detail further below, can sense respective objects outside a viewing angle of the camera 200, though each radar is not limited to only sensing objects outside of the viewing angle of the camera 200 and may sense objects within the viewing angle of the camera 200 depending on the inclination of each rotating member 12 and the fixed member 110. In an example, each rotating member 120 may be disposed to be inclined to have respective obtuse angles with the fixed member 110. The respective obtuse angles may be the same or different.

The camera 200 is installed on the fixed member 110 to image to the front or rear of the vehicle 10, and as a non-limiting example. In addition, the camera 200 is connected to the controller 150 to transmit information on the image acquired by the camera 200 to the controller 150. The camera 200 will be described in greater detail further below.

The radar 130 may each be fixedly installed on a corresponding rotating member 120 and sense respective objects outside of the viewing angle of the camera 200. As an example, each radar 130 may operate to collect data such as speed, distance, and the like. Each radar 130 may also be connected to the controller 150, like the camera 200, and the information obtained through each radar 130 transmitted to the controller 150.

Each driving unit 140 is connected to a corresponding rotating member 120 to rotate the corresponding rotating member 120 with respect to the fixed member 110. To this end, each driving unit 140 may include a driving source and a power transmission member configured to transmit driving force generated by the driving source to the corresponding rotating member 120. Meanwhile, each driving unit 140 may also be connected to the controller 150, and may respectively control rotation of the rotating member 120 according to signal(s) from the controller 150.

The controller 150 is connected to the camera 200, each radar 130, and each driving unit 140, and serves to control driving of the driving unit 140 to rotate either or both rotating members 120. In addition, signals received from the camera 200 and each radar 130 may be transmitted to an advance driver assistant system (ADAS), as a non-limiting example.

The case in which the driving unit 140 is provided is a non-limiting example. For example, the sensing device 100 may be installed with each of the rotating members 120 being individually or collectively rotated to be inclined with respect to the fixed member 110, and then each rotating member 120 fixed in the vehicle with respect to their respective inclines of the fixed member 110.

Figure 3:
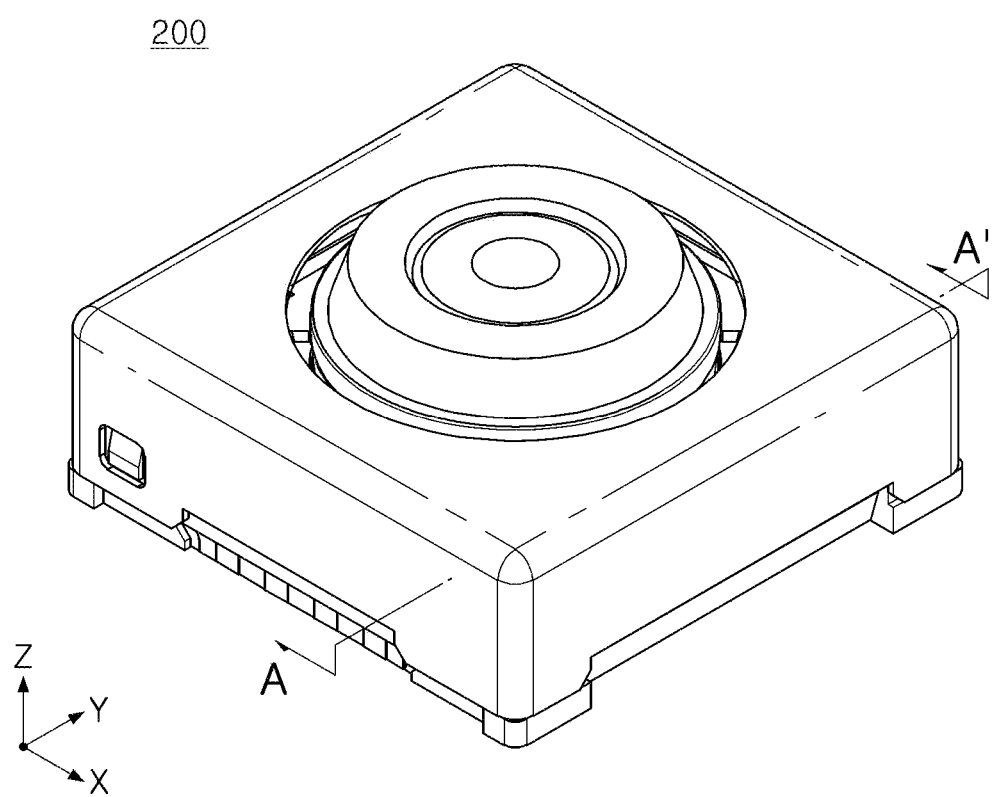
FIG. 3 is a perspective view of a camera of a sensing device according to one or more embodiments.
Figure 4:
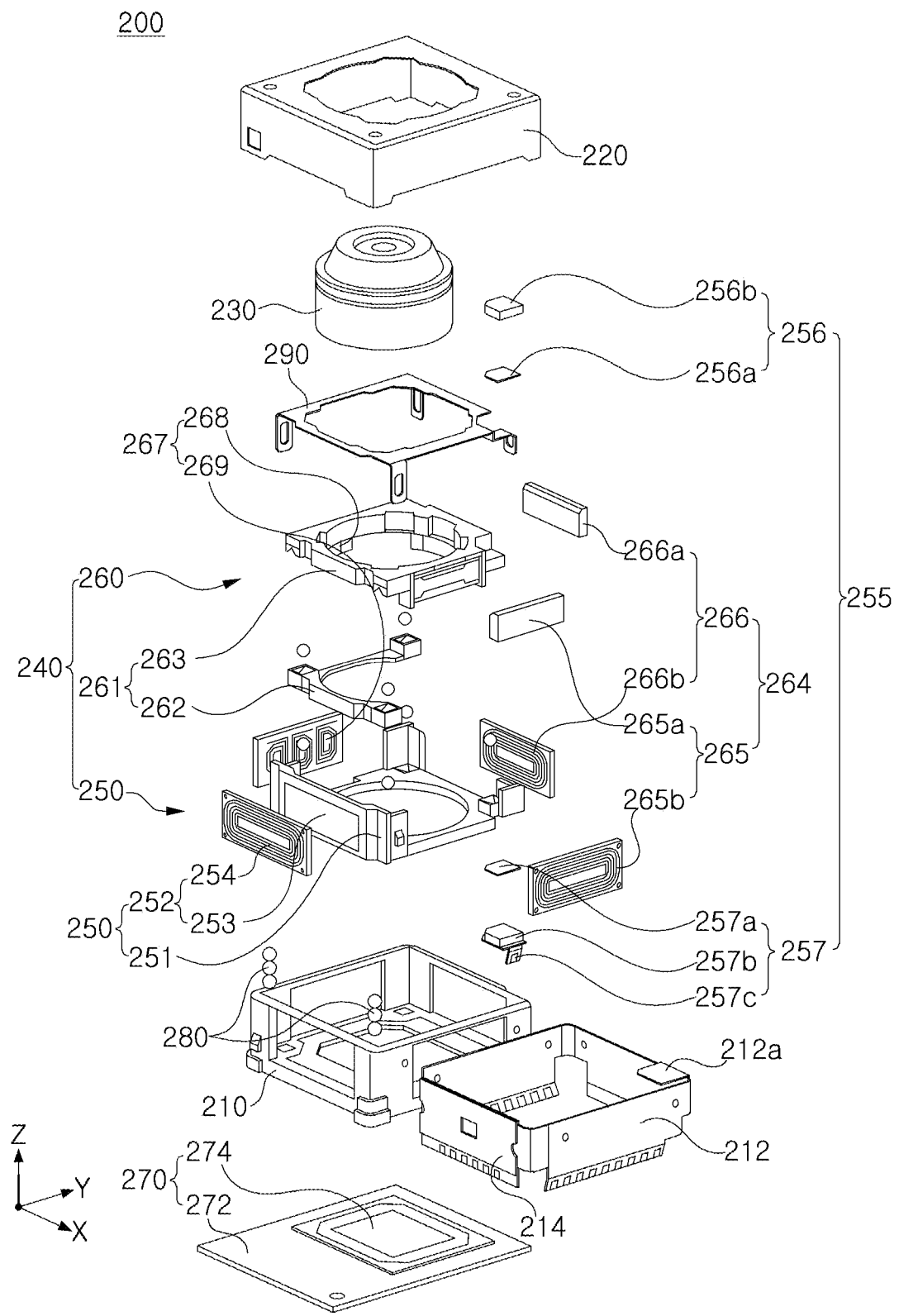
FIG. 4 is an exploded perspective view illustrating a camera of a sensing device according to one or more embodiments.

FIG. 3 is a perspective view of a camera of a sensing device according to one or more embodiments, and FIG. 4 is an exploded perspective view illustrating a camera of a sensing device according to one or more embodiments.

Referring to FIGS. 3 and 4, a camera 200 may include a housing 210, a shield case 220, a lens barrel 230, a lens driving device 240, and an image sensor unit 270.

The housing 210 may be formed to have an internal space in which the lens barrel 230 and the lens driving device 240 can be accommodated. As an example, the housing 210 may have a hexahedral box shape with six open surfaces. In addition, the housing 210 may be made of a plastic material. As an example, a bottom surface of the housing 210 may be open for the image sensor unit 270, and four side surfaces of the housing 210 may be open for installation of the lens driving device 240.

The shield case 220 is coupled to the housing 210 so as to surround an outer surface of the housing 210, and serves to protect internal components of the camera 200. In addition, the shield case 220 may perform an operation of shielding electromagnetic waves. As an example, the case 210 may shield the electromagnetic waves so that the electromagnetic waves generated by the camera 200 do not affect other electronic components in the portable electronic device.

The shield case 220 is made of a metal material, and may be grounded to a ground pad provided on the printed circuit board 274 of the image sensor unit 270 to be described in greater detail further below, thereby shielding electromagnetic waves.

However, the present disclosure is not limited thereto, and the shield case 220 may also be formed of a plastic injection product. In this case, a conductive paint may be applied to an inner surface of the shield case 220, or a conductive film or a conductive tape may be attached to the inner surface of the shield case 220 to shield electromagnetic waves. In this case, conductive epoxy may be used as the conductive paint, but the present disclosure is not limited thereto, and various materials having conductivity may be used in various examples.

The lens barrel 230 may have a hollow cylindrical shape so that a plurality of lenses for imaging a subject can be accommodated therein, and the plurality of lenses are mounted on the lens barrel 230 along the optical axis (Z axis).

Depending on embodiment, various numbers of lenses are disposed in the plurality of lenses of the lens barrel 230, and each of the lenses has optical characteristics such as the same or different refractive indices in such various examples.

The lens driving device 240 is a device moving the lens barrel 230. As an example, the lens driving device 240 may adjust a focus by moving the lens barrel 230 in the optical axis (Z axis) direction, and correct shaking during capturing by moving the lens barrel 230 in the optical axis (Z axis) direction The lens driving device 240 includes a focus adjustment unit 250 for adjusting a focus, and a shake correction unit 260 for correcting shaking. More detailed descriptions of the focus adjustment unit 250 and the shake correction unit 260 will be presented in greater detail further below.

The image sensor unit 270 is a device converting light incident through the lens barrel 230 into an electrical signal. As an example, the image sensor unit 270 may include an image sensor 272 and a printed circuit board 274, and may be representative of including an infrared filter.

The image sensor 272 is installed on the printed circuit board 274, and the infrared filter may block light in an infrared region from entering the image sensor 272 among the light incident through the lens barrel 230.

The image sensor 272 converts light incident through the lens barrel 230 into an electrical signal. As an example, the image sensor 272 may be a Charge Coupled Device (CCD) or a Complementary Metal-Oxide Semiconductor (CMOS), as non-limiting examples.

The electrical signal converted by the image sensor 272 may be finally transmitted to an advanced driver assistant system (ADAS), as a non-limiting example. The image sensor 272 may be fixed to the printed circuit board 274, and electrically connected to the printed circuit board 274 by wire bonding, for example.

Figure 5:
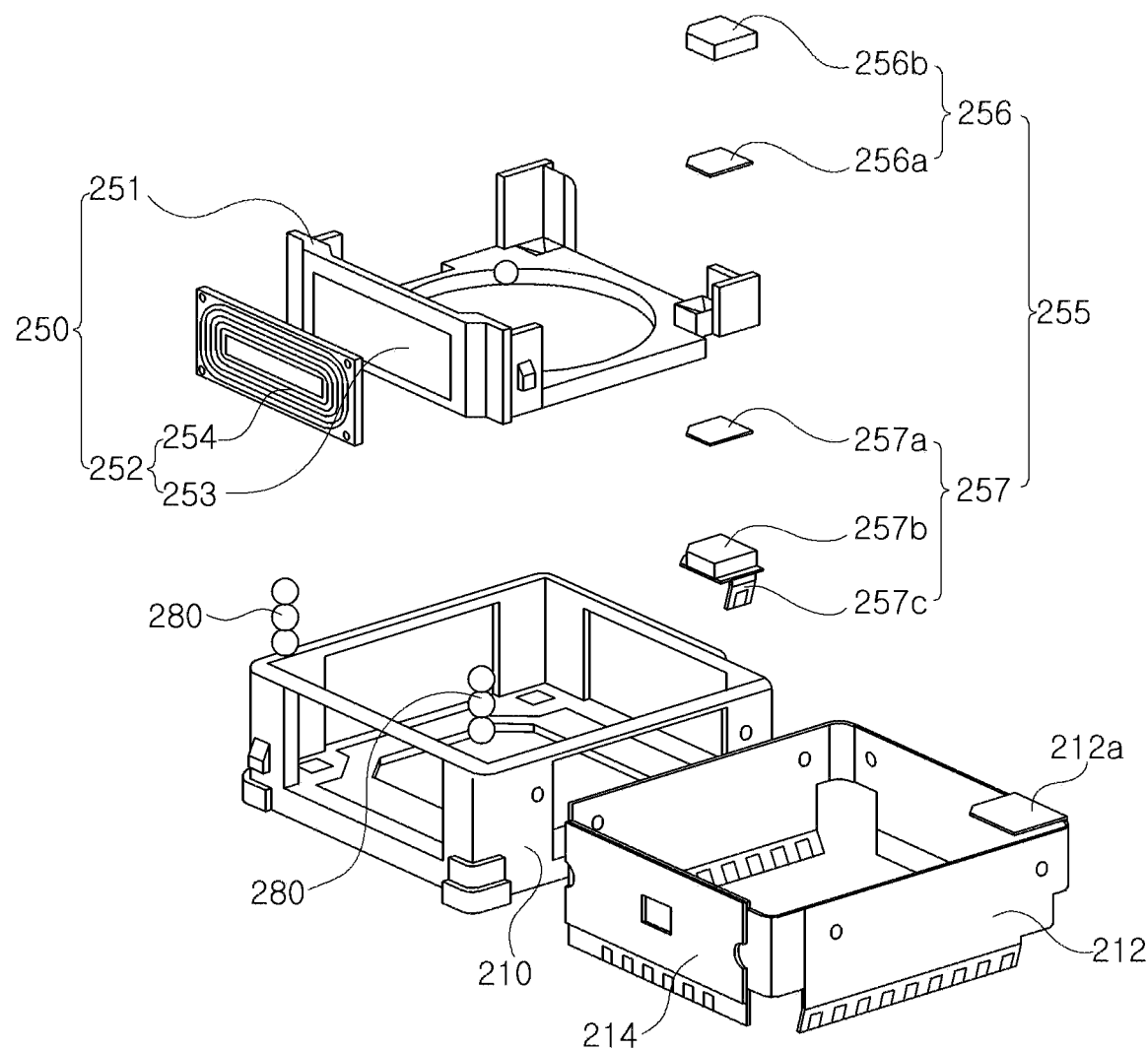
FIG. 5 is an enlarged exploded perspective view illustrating a focus adjustment unit provided in a camera module according to one or more embodiments.
Figure 6:
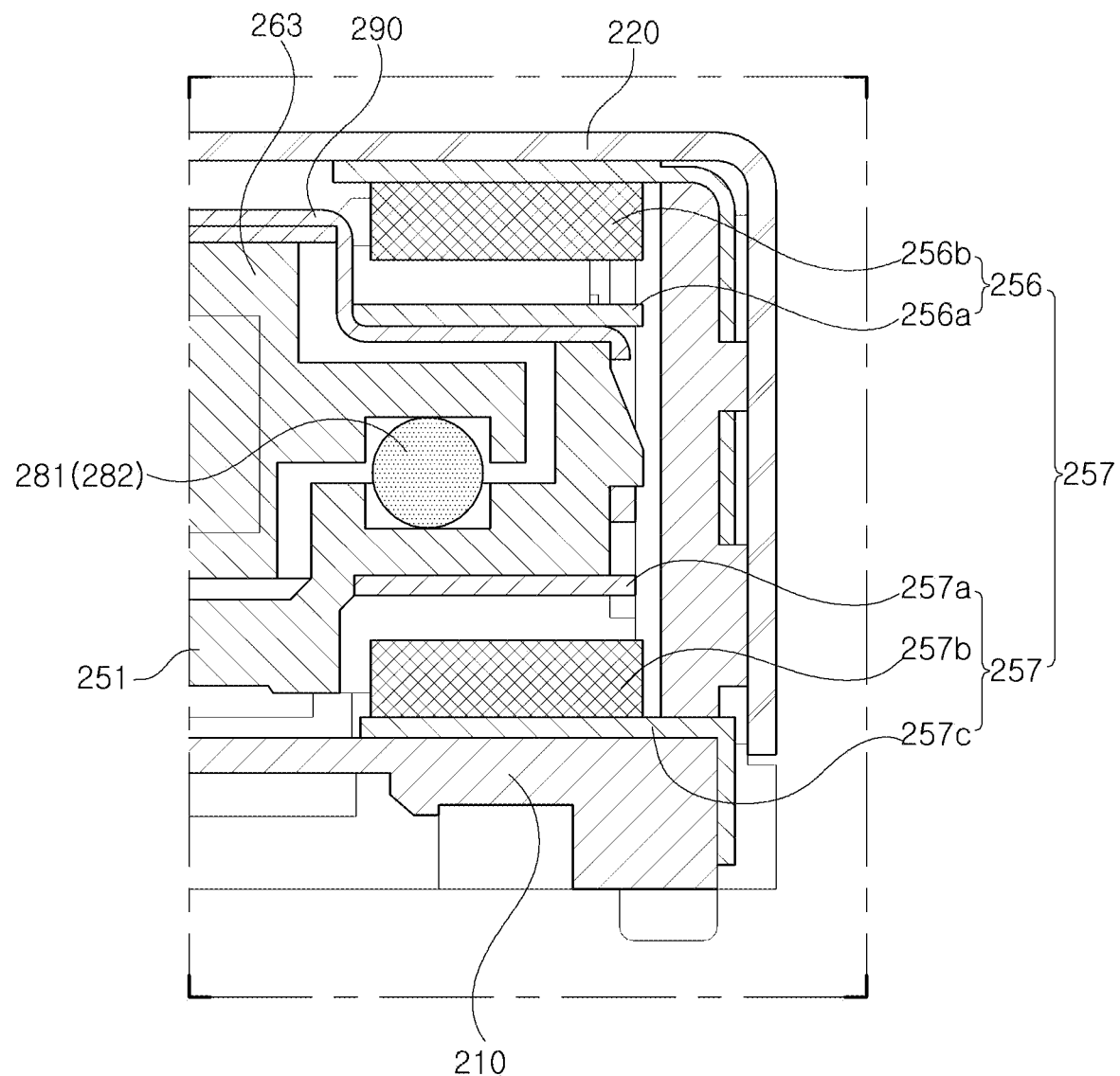
FIG. 6 is a cross-sectional view taken along line A-A' of FIG. 3 according to one or more embodiments.

FIG. 5 is an enlarged exploded perspective view illustrating a focus adjustment unit provided in the camera module according to one or more embodiments, and FIG. 6 is a cross-sectional view taken along line A-A' of FIG. 3 according to one of more embodiments.

Referring to FIGS. 4-6, a lens driving device 240 (see FIG. 4) moves a lens barrel 230 (see FIG. 4) to focus on a subject.

For example, a focus adjustment unit 250 moving the lens barrel 230 in the optical axis (Z axis) direction may be provided. The focus adjustment unit 250 may include a carrier 251 accommodating the lens barrel 230, and a focus adjustment driving unit 252 generating driving force to move the lens barrel 230 and the carrier 251 in the optical axis (Z axis) direction.

The focus adjustment driving unit 252 includes a focus adjustment magnet 253 installed in any one of the carrier 251 and the housing 210, and a focus adjustment coil 254 disposed opposite to the focus adjustment magnet 253.

The focus adjustment magnet 253 is mounted on the carrier 251. As an example, the focus adjustment magnet 253 may be mounted on one surface of the carrier 251.

The focus adjustment coil 254 is mounted on the housing 210. As an example, the focus adjustment coil 254 may be mounted on the housing 210 using a substrate 212.

The focus adjustment magnet 253 is a moving member mounted on the carrier 251 and moves in the optical axis (Z axis) direction together with the carrier 251, and the focus adjustment coil 254 is a fixed member fixed to the housing 210. However, examples are not limited thereto, as the installation positions of the focus adjustment magnet 253 and the focus adjustment coil 254 may also be varied in other examples.

Meanwhile, when power is applied to the focus adjustment coil 254, the carrier 251 may be moved in the optical axis (Z axis) direction due to electromagnetic influence between the focus adjustment magnet 253 and the focus adjustment coil 254.

Since the lens barrel 230 is accommodated in the carrier 251, the lens barrel 230 is also moved in the optical axis (Z axis) direction by the movement of the carrier 251.

When the carrier 251 is moved, a rolling member 280 is disposed between the carrier 251 and the housing 210 to reduce friction between the carrier 251 and the housing 210.

For example, the rolling (ball) member 280 may be disposed on both sides of the focus adjustment magnet 253. As an example, the plurality of rolling members 280 may be disposed to form one row on both sides of the focus adjustment magnet 253. As an example, the rolling members 280 may be bearings.

A focus adjustment yoke 214 is disposed in the housing 210. As an example, the focus adjustment yoke 214 is disposed to face the focus adjustment magnet 253 with the focus adjustment coil 254 therebetween.

Attractive force acts in a direction, perpendicular to the optical axis (Z axis) between the focus adjustment yoke 214 and the focus adjustment magnet 253. Accordingly, a rolling member 280 may maintain a contact state with the carrier 251 and the housing 210 by the attractive force between the focus adjustment yoke 214 and the focus adjustment magnet 253.

In addition, the focus adjustment yoke 214 also operates to focus the magnetic force of the focus adjustment magnet 253. Accordingly, the occurrence of leakage of magnetic flux may be reduced. For example, the focus adjustment yoke 214 and the focus adjustment magnet 253 form a magnetic circuit. In this case, a length of the focal adjustment yoke 255 in the optical axis (Z axis) direction may be longer than a length of the focus adjustment magnet 253 in the optical axis (Z axis) direction.

The focus adjustment unit 250 may further include a focus adjustment sensing unit 255 disposed in a region, other than a surface on which the focus adjustment magnet 253 and the focus adjustment coil 254 are installed, for example.

As an example, the focus adjustment sensing unit 255 may include a first focus adjustment sensing unit 256 disposed on an upper end portion of the housing 210, and a second focus adjustment sensing unit 257 disposed to be spaced apart from a lower portion of the first focus adjustment sensing unit 256.

Further, the rolling (ball) member 280 provided in a shake correction unit 260, described in greater detail further below with respect to FIG. 5, may be disposed between the first focus adjustment sensing unit 256 and the second focus adjustment sensing unit 257.

The first focus adjustment sensing unit 256 may include a first focus adjustment sensing yoke 256a installed on an upper end portion of the housing 210, and a first focus adjustment sensing coil 256b disposed opposite to the first focus adjustment sensing yoke 256a.

Further, the second focus adjustment sensing unit 257 may include a second focus adjustment sensing yoke 256a installed on a lower end portion of the housing 210, and a second focus adjustment sensing coil 257b disposed opposite to the second focus adjustment sensing yoke 257a.

In addition, the second focus adjustment sensing unit 257 may further include a connection substrate 257c connected to a substrate 212 to which the focus adjustment coil 254 is connected. In addition, the first focus adjustment sensing unit 256 may be connected to a connection unit 212a of the substrate 212.

Meanwhile, since the first focus adjustment sensing unit 256 and the second focus adjustment sensing unit 257 may differ only in their respective installed positions, as a non-limiting example, only the first focus adjustment sensing unit 256 will be described below and a detailed description of the second focus adjustment sensing 257 will be omitted.

The first focus adjustment sensing coil 256b may include at least two or more coils. The inductance of the first focus adjustment sensing coil 256b may be changed according to the displacement of the first focus adjustment sensing yoke 257a.

Meanwhile, in an example, a closed loop control approach that senses and feedbacks a position of the lens barrel 230 may be implemented. Accordingly, a focus adjustment sensing unit 255 for the closed loop control may be provided.

Looking at the closed loop control in more detail, when power of the camera 200 is turned on, an initial position of the lens barrel 230 may be sensed by the focus adjustment sensing unit 255.

The lens barrel 230 may be moved from the sensed initial position to an initial setting position.

Here, the initial position may refer to a position of the lens barrel 230 in the optical axis direction when the camera 200 is turned on, and the initial setting position may refer to a position at which the focus of the lens barrel 230 becomes infinite.

The lens barrel 230 may be moved from the initial setting position to a target position by a driving signal of the circuit element. During the focus adjustment process, the lens barrel 230 may move forward and backward in the optical axis (Z axis) direction (i.e., the lens barrel 230 can move in both directions).

Figure 7:
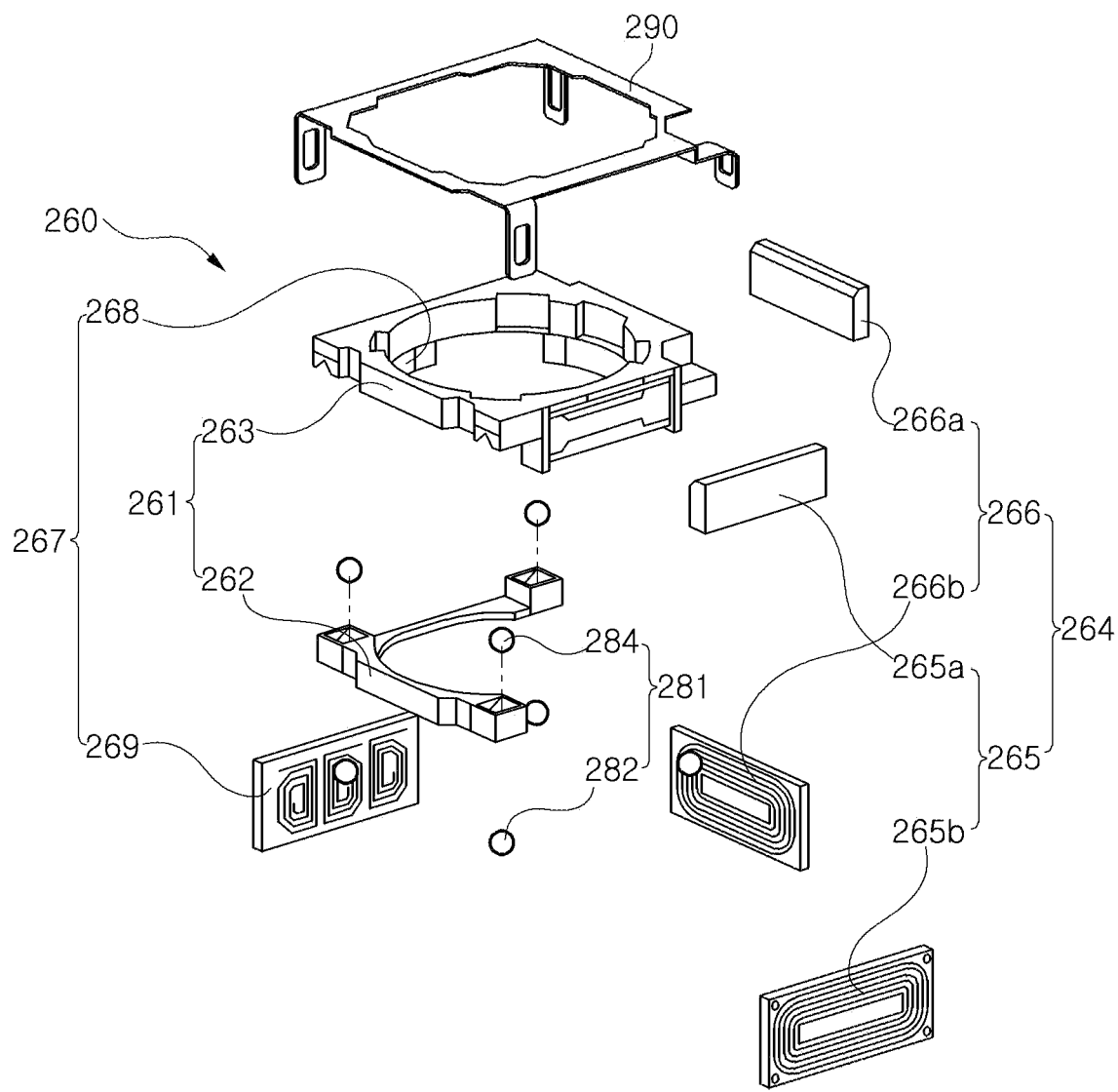
FIG. 7 is an enlarged exploded perspective view illustrating a shake correction unit provided in a camera module according to one or more embodiments.

FIG. 7 is an enlarged exploded perspective view illustrating a shake correction unit provided in a camera module according to one or more embodiments.

A shake correction unit 260 may be used to correct blurring of an image or shaking of a moving picture due to factors such as vibrations during image capturing or moving picture capturing. For example, the shake correction unit 260 may compensate for shaking by applying a relative displacement corresponding to the shaking to the lens barrel 230 when shaking occurs during image capturing due to vibrations, or the like. As an example, the shake correction unit 260 corrects shaking by moving the lens barrel 230 in a direction, perpendicular to the optical axis (Z axis).

Referring to FIG. 7, the shake correction unit 260 may include a guide member 261 guiding a movement of the lens barrel 230, and a shake correction driving unit 264 generating driving force to move the guide member 261 in a direction, perpendicular to the optical axis (Z axis).

The guide member 261 may include a frame 262 and a lens holder 263. The frame 262 and the lens holder 263 may be inserted into a carrier 251 and disposed in the optical axis (Z axis) direction, and operate to guide the movement of the lens barrel 230.

The frame 262 and the lens holder 263 have a space into which the lens barrel 230 may be inserted. The lens barrel 230 is fixed to the lens holder 263.

The frame 262 and the lens holder 263 may be moved in the carrier 251 in a direction, perpendicular to the optical axis (Z axis) by the driving force generated by the shake correction driver 264.

The shake correction driving unit 264 may include a first shake correction driving unit 265 generating driving force in a direction of a first axis (X axis), perpendicular to the optical axis (Z axis), and a second shake correction driving unit 266 generating driving force in a direction of a second axis (Y axis), perpendicular to both the optical axis (Z axis) and the first axis (X axis).

The first shake correction driving unit 265 may generate driving force in a direction of a first axis (X axis), perpendicular to the optical axis (Z axis), and the second shake correction driving unit 266 may generate driving force in a direction of a second axis (Y axis), perpendicular to the first axis (X axis).

Here, the second axis (Y axis) refers to an axis, perpendicular to both the optical axis (Z axis) and the first axis (X axis).

The first shake correction driving unit 265 and the second shake correction driving unit 266 may be disposed to be orthogonal to each other in a plane, perpendicular to the optical axis (Z axis). As an example, the first shake correction driving unit 265 and the second shake correction driving unit 266 may be disposed to be orthogonal to each other in a plane, perpendicular to the optical axis (Z axis).

As an example, the first shake correction driving unit 265 may include a first shake correction magnet 265a installed in any one of the frame 262 and the housing 210, and a first shake correction coil 265b disposed opposite to the first shake correction magnet 265a.

The second shake correction driving unit 266 may include a second shake correction magnet 266a installed in any one of the frame 262 and the housing 210, and a second shake correction coil 266b disposed opposite to the second shake correction magnet 266a.

Meanwhile, the first and second shake correction magnets 265a and 266a may be mounted on the lens holder 263, and the first and second shake correction coils 265b and 266b disposed opposite to the first and second shake correction magnets 265a and 266a may be mounted on the housing 210. As an example, the first and second shake correction coils 265b and 266b may be mounted on the housing 210 using a substrate 212.

The first and second shake correction magnets 265a and 266a are moving members that are moved in a direction, perpendicular to the optical axis (Z axis) together with the lens holder 263, and the first and second shake correction coils 265b and 266b are fixed members that are fixed to the housing 210. However, examples are not limited thereto, and the positions of the first and second shake correction magnets 265a and 266a and the first and second shake correction coils 265b and 266b may vary in different embodiments.

The shake correction unit 260 may further include a shake correction sensing yoke 268 installed in the lens holder 263 and a shake correction sensing sensor unit 267 having a shake correction sensing coil 269 disposed opposite to the shake correction sensing yoke 268.

As an example, the shake correction sensing sensor unit 267 may be disposed on a surface, orthogonal to one surface of the carrier 251 on which the focus adjustment magnet 253 is installed.

Meanwhile, the shake correction sensing coil 269 may be mounted on the housing 210 using a substrate 212. That is, the shake correction sensing coil 269 is a fixed member, and the shake correction sensing yoke 268 is a moving member.

In a lens driving apparatus 240 example, a closed loop control approach in which the position of the lens barrel 230 is sensed and feedbacked during the shake correction process may be used. To this end, the shake correction sensing sensor unit 267 described above is provided.

Looked at in more detail with respect to the closed loop control, when power of the camera 200 is turned on, an initial position of the lens barrel 230 may be sensed by the shake correction sensing sensor unit 267. The lens barrel 230 may be moved from the sensed initial position to an initial setting position.

Here, the setting position may refer to a center of a movable range in the first axis (X axis) direction and a center of a movable range in the second axis (Y axis) direction. Mechanically, the setting position may refer to a center in the first axis (X axis) direction and a center in the second axis (Y axis) direction of the carrier 251 in which the shake correction unit 260 is accommodated.

Meanwhile, a plurality of rolling (ball) members 281 supporting the shake correction unit 260 may be provided. The plurality of rolling members 281 operate to guide the frame 262 and the lens holder 263 in the shake correction process. In addition, the plurality of rolling members 281 may also operate to maintain a gap between the carrier 251, the frame 262, and the lens holder 263.

The plurality of rolling members 281 may include a first ball member 282 and a second ball member 284.

The first ball member 282 guides the movement of the shake correction unit 260 in the first axis (X-axis) direction, and the second ball member 284 guides the movement of the shake correction unit 260 in the second axis (Y-axis) direction.

For example, the first ball member 282 rolls in the first axis (X axis) direction, when driving force is generated in the first axis (X axis) direction. Accordingly, the first ball member 282 guides the movement of the frame 262 and the lens holder 263 in the first axis (X axis) direction.

In addition, the second ball member 284 rolls in the second axis (Y axis) direction, when driving force is generated in the second axis (Y axis) direction. Accordingly, the second ball member 284 guides the movement of the lens holder 263 in the second axis (Y-axis) direction.

The first ball member 282 may include a plurality of ball members disposed between the carrier 251 and the frame 262, and the second ball member 284 may include a plurality of ball members disposed between the frame 262 and the lens holder 263.

Further, in an example, a stopper 290 may be provided to prevent the plurality of ball members 281, the frame 262, and the lens holder 263 from being separated from the outside of the carrier 251 due to external impact, or the like (see FIG. 4).

Figure 8:
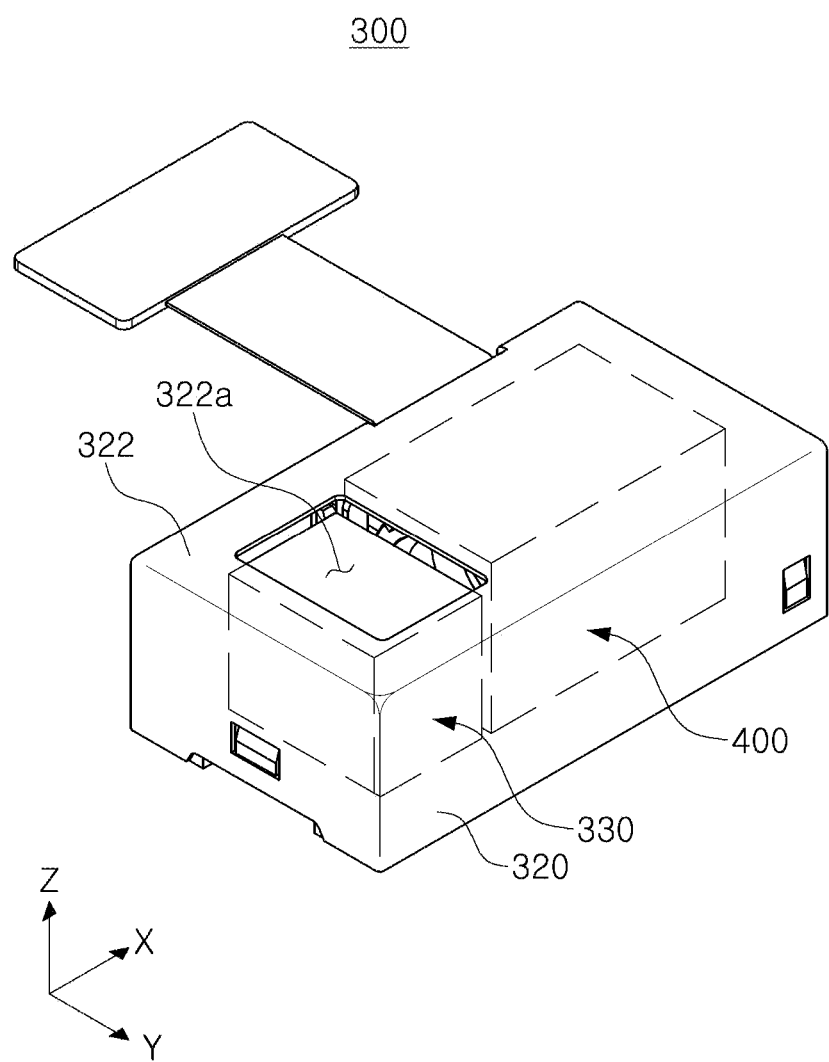
FIG. 8 is a perspective view illustrating a camera of a sensing device according to one or more embodiments.
Figure 9:
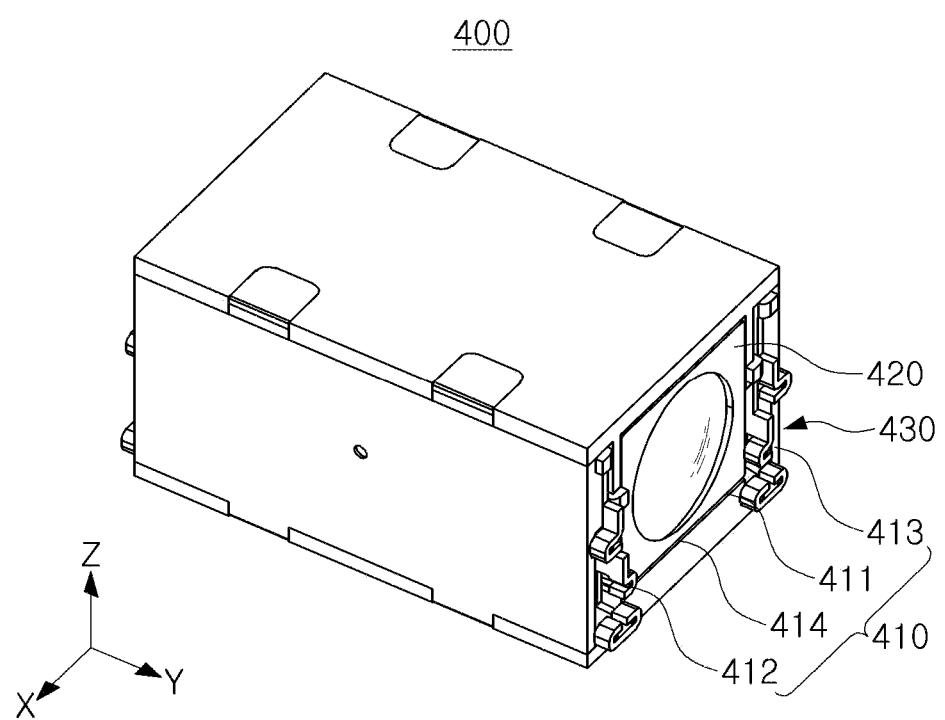
FIG. 9 is a perspective view illustrating a lens module provided in a camera of a sensing device according to one or more embodiments.
Figure 10:
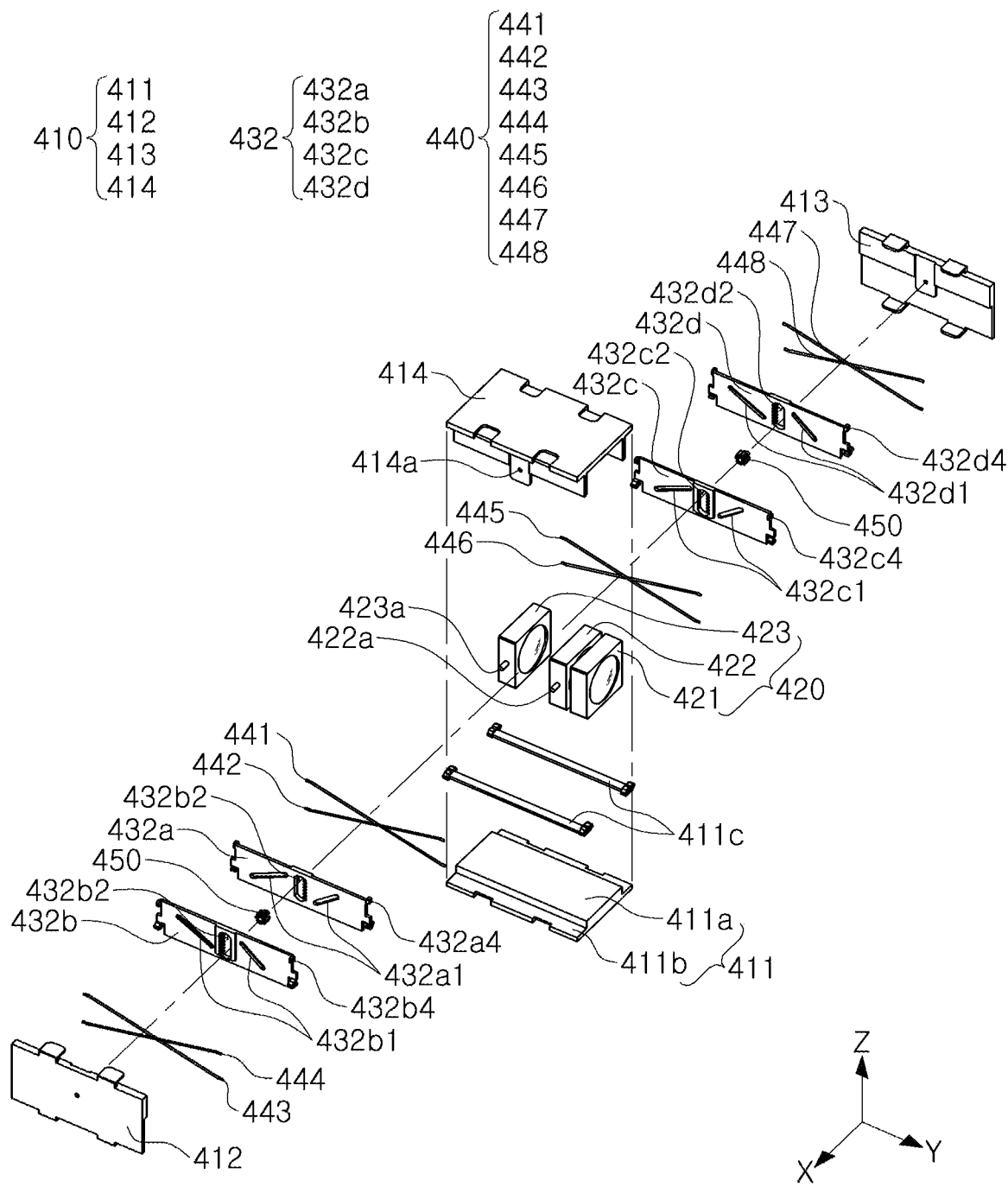
FIG. 10 is an exploded perspective view illustrating a camera of a sensing device according to one or more embodiments.

FIG. 8 is a perspective view illustrating a camera of a sensing device according to one or more embodiments, FIG. 9 is a perspective view illustrating a lens module provided in a camera of a sensing device according to one or more embodiments, and FIG. 10 is an exploded perspective view illustrating a camera of a sensing device according to one or more embodiments.

Referring to FIGS. 8 to 10, a camera 300 may include a reflection module 330 provided in a housing 320, a lens module 400, and are further representative of also including an image sensor module, for example.

The reflection module 330 may be configured to change a direction of travel of light. For example, the direction of travel of light incident through an opening 322a of a cover 322 covering the camera 300 from the top may be changed toward the lens module 400 through the reflection module 330. To this end, the reflection module 330 may include a reflection member configured to reflect light.

A path of the light incident through the opening 322a may be changed by the reflection module 330 toward the lens module 400. For example, the path of light incident in the thickness direction (Z-axis direction) of the camera 300 is changed by the reflection module 330 to substantially coincide with the optical axis (Y-axis) direction.

The lens module 400 may include a plurality of lenses through which light, whose direction of travel has been changed by the reflection module 330, passes, and the image sensor module is representative of including an image sensor configured to convert light having passed through the plurality of lenses into an electrical signal, and a printed circuit board on which the image sensor is mounted. The image sensor module may include an optical filter configured to filter light incident from the lens module 100. The optical filter may be an infrared cut filter.

In the inner space of the housing 320, a reflection module 330 may be provided in front of the lens module 400 around the lens module 400, and an image sensor module may be provided behind the lens module 400.

Referring to FIGS. 9 and 10, as an example, a lens module 400 may include a carrier 410, a lens unit 420, a lens guide unit 430, and a driving wire 440.

The carrier 410 has an internal shape, and the lens unit 420 is disposed in the internal space of the carrier 410. As an example, the carrier 410 may have a rectangular parallelepiped box shape with substantially open both end portions. The carrier 410 may include a bottom plate 411, a front plate 412 installed on one surface of the bottom plate 411, a rear plate 413 disposed opposite to the front surface 412, and a cover plate 414 disposed opposite to the bottom plate 411. Both end portions of the carrier 410 may be in an open state.

The bottom plate 411 may include a support unit 411a on which the lens unit 420 is disposed, and a mounting unit 412b extending from both side surfaces of the support unit 411a and on which an installation bar 411c to which the driving wire 440 is connected. As an example, the support unit 411a and the mounting unit 412b of the bottom plate 411 may be formed to be stepped.

Meanwhile, the cover plate 414 is provided with an extension unit 414a that may extend to a central portion of the front plate 412 and the rear plate 413, and one end of an elevating auxiliary gear 450 may be rotatably coupled to the extension unit 414a, and the other end of the elevating auxiliary gear 450 may be rotatably coupled to the front plate 412 and the rear plate 413.

Here, when defining a term for a direction, a thickness direction of the carrier 410 refers to the Z-axis direction shown in FIGS. 9 and 10, and a length direction of the carrier 410 refers to the Z-axis direction shown in FIGS. 9 and 10, and a width direction of the carrier 410 refers to the X-axis direction shown in FIGS. 9 and 10.

The lens unit 420 may be formed of a plurality of lens groups, and may be installed on the carrier 410 to be disposed in the internal space of the carrier 410. As an example, the lens unit 420 may include a first lens group 421 fixedly installed at one end of the carrier 410, a second lens group 422 disposed on one side of the first lens group 421 and movably installed on the carrier 410, and a third lens group 423 disposed on one side of the second lens group 422 and movably installed on the carrier 410.

Meanwhile, the second and third lens groups 422 and 423 may be connected to the lens guide unit 430 and moved in the Y-axis direction. To this end, the second and third lens groups 422 and 423 may be provided with coupling protrusions 422a and 423a for connection with the lens guide unit 430.

In addition, at least one of the first, second, and third lens groups 421, 422, and 423 making up the lens unit 420 may include a plurality of lenses.

In the lens guide unit 430, a plurality of guide members 432 may be disposed on both side surfaces of the lens groups 421, 422, and 423, respectively, to guide the movement of at least two lens groups 422 and 423 among the plurality of lens groups 421, 422, and 423. That is, the lens guide unit 430 may be connected to the lens unit 420 and may serve to guide the movement of some of the lens groups making up the lens unit 420, that is, the second and third lens groups 422 and 423.

A guide member 432 of the guide unit 430 may include a first guide member 432a disposed on one surface of the second and third lens groups 422 and 423, and a second guide member 432b disposed to overlap the first guide member 432a, a third guide member 432c disposed on the other surface of the second and third lens groups 422 and 423, and a fourth guide member 432d disposed to overlap the third guide member 432c.

Meanwhile, the first guide member 432a may be provided with a plurality of first guide holes 432a1 disposed to be inclined in one direction, and the second guide member 432b may be provided with a plurality of second guide holes 432b1 disposed to cross the first guide holes 432a1. In addition, the third guide member 432c may be provided with a plurality of third guide holes 432c1 disposed to be inclined in one direction, and the fourth guide member 432d may be provided with a plurality of fourth guide holes 432d1 disposed to cross the third guide holes 432c1.

The first guide member 432 may be provided with a first gear installation hole 432a2 disposed in a central portion, and the second guide member 432b may be provided with a second gear installation hole 432b2 disposed in a central portion and corresponding to the first gear installation hole 432a2. In addition, the third guide member 432c may be provided with a third gear installation hole 432c2 disposed in a central portion, and the fourth guide member 432d may be provided with a fourth gear installation hole 432d2 disposed in a central portion and corresponding to the third gear installation hole 432c2.

Threaded units 432a3, 432b3, 432c3, 432d2 disposed in the first to fourth gear installation holes 432a2, 432b2, 432c2, 432d2 may be provided in inner surfaces of the first to fourth guide members 432a, 432b, 432c, and 432d. Meanwhile, the elevating assistance gear 190 described above may be coupled to the threaded units 432a3, 432b3, 432c3, and 432d2.

Furthermore, separation prevention holes 432a4, 432b4, 432c4, and 432d4 for preventing separation from the carrier 410 may be provided at both ends of the first to fourth guide members 432a, 432b, 432c, and 432d.

The driving wire 440 generates driving force for moving the lens unit 420. As an example, at least two thereof are connected to each of the guide members 432 and may be made of a shape memory alloy.

The driving wire 440 may include first and second driving wires 441 and 442 connected to cross each other with the first guide member 432a, and third and fourth driving wires connected to cross each other with the second guide member 432b. 443 and 444, fifth and sixth drive wires 445 and 446 connected to cross each other with the third guide member 432c, and seventh and eighth drive wires 447 and 448 connected to cross each other with the fourth guide member 432d.

Meanwhile, the first to eighth drive wires 441 to 448 may have one end connected to the guide member 432 and the other end connected to the installation bar 411c of the carrier 410. As described above, according to the expansion and contraction of the driving wire 440 made of a shape memory alloy, the second and third lens groups 422 and 423 of the lens unit 420 may be moved in the Y-axis direction from the carrier 410.

For example, when such sensing devices according to one or more embodiments are installed in a vehicle, for example, there is less difficulty to install the camera with such radars compared to previous approaches of respective component installations.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A sensing device, comprising:
a fixed member;
a rotation member disposed at both ends of the fixed member;
a camera installed on the fixed member; and
respective radar units installed on the rotation members,
wherein the respective radar units are configured to sense respective objects at edges of a viewing angle of the camera and respective objects outside of the viewing angle of the camera.

2. The sensing device of claim 1, further comprising a rotation member driving unit connected between each of the rotation members and the fixed member, to respectively rotate each of the rotation members with respect to the fixed member.

3. The sensing device of claim 2, further comprising a controller in communication with the camera and the respective radar units, and configured to respectively control the rotation member driving units.

4. The sensing device of claim 3, wherein a first signal of the controller controls a first rotation member driving unit, to selectively change a first inclination angle between a first rotation member of the respective rotation members and the fixed member, independently of a second signal of the controller that controls a second rotation member driving unit to selectively change a second inclination angle between a second rotation member of the respective rotation members and the fixed member.

5. The sensing device of claim 4, wherein the first inclination angle is different than the second inclination angle.

6. The sensing device of claim 1, wherein the camera comprises:
a lens barrel;
a focus adjustment unit configured to control movement of the lens barrel in a first direction, which is an optical axis direction;
a shake correction unit configured to control movement of the lens barrel in a second direction, perpendicular to the optical axis direction; and
a housing accommodating the lens barrel, the focus adjustment unit, and the shake correction unit.

7. The sensing device of claim 6, wherein the focus adjustment unit comprises a carrier accommodating the lens barrel, a focus adjustment magnet installed in any one of the carrier and the housing, and a focus adjustment coil disposed opposite to the focus adjustment magnet.

8. The sensing device of claim 6, wherein the shake correction unit comprises a guide member to guide the controlled movement of the lens barrel in the second direction, and a shake correction driving unit configured to generate a driving force to move the guide member in the second direction.

9. The sensing device of claim 8, wherein the guide member comprises a frame installed in a carrier that accommodates the lens barrel, and a lens holder in which the lens barrel is installed.

10. The sensing device of claim 9, wherein the shake correction driving unit comprises a first shake correction driving unit configured to generate a driving force in a first axis direction, perpendicular to the optical axis, and a second shake correction driving unit configured to generate a driving force in a second axis direction, perpendicular to both the optical axis direction and the first axis direction.

11. The sensing device of claim 10, wherein the first shake correction driving unit comprises a first shake correction magnet installed in any one of the frame and the housing, and a first shake correction coil disposed opposite to the first shake correction magnet.

12. The sensing device of claim 10, wherein the second shake correction driving unit comprises a second shake correction magnet installed in any one of the frame and the housing, and a second shake correction coil disposed opposite to the second shake correction magnet.

13. The sensing device of claim 9, wherein the shake correction unit further comprises a plurality of ball members configured to guide the frame and the lens holder.

14. The sensing device of claim 1, wherein the camera module comprises a reflection module configured to change a path of light incident on the reflection module, and a lens module configured to receive the changed path light from the reflection module, and wherein the lens module comprises:
a carrier having an internal space;
a lens unit having a plurality of lens groups, and installed on the carrier so that at least one of the lens groups is movable in a longitudinal direction of the carrier;
a guide unit including a plurality of guide members disposed on opposing side surfaces of the plurality of lens groups, respectively, to guide movement of at least two lens groups of the plurality of lens groups; and
at least two driving wires respectively connected to each of the guide members, made of a shape memory alloy.

15. The sensing device of claim 14, wherein the guide unit comprises a first guide member disposed on one side of a lens group of the plurality of lens groups, a second guide member disposed to overlap the first guide member, a third guide member disposed on an opposite side surface of the lens group of the plurality of lens groups, and a fourth guide member disposed to overlap the third guide member.

16. The sensing device of claim 15, wherein the first guide member is provided with a plurality of first guide holes disposed to be inclined in one direction, the second guide member is provided with a plurality of second guide holes disposed to cross the first guide holes, the third guide member is provided with a plurality of third guide holes disposed to be inclined in a direction, and the fourth guide member is provided with a plurality of fourth guide holes disposed to cross the third guide holes.

17. The sensing device of claim 14, wherein the driving wire comprises first and second driving wires connected to cross each other with the first guide member, third and fourth driving wires connected to cross each other with the second guide member, fifth and sixth driving wires connected to cross each other with the third guide member, and seventh and eighth driving wires connected to cross each other with the fourth guide member.

18. The sensing device of claim 14, wherein the lens unit comprises a first lens group fixedly installed at one end of the carrier, a second lens group disposed at a rear end of the first lens group and configured in the carrier to be movable along an incident direction of light, and a third lens group disposed at a rear end of the second lens group and configured in the carrier to be movable, and the second and third lens groups are provided with a coupling protrusion coupled to a guide member of the guide unit.

\* \* \* \* \*